United States Patent [19]

Matsumoto et al.

[11] Patent Number: 5,002,911

[45] Date of Patent: Mar. 26, 1991

[54] CERAMICS WITH HIGH TOUGHNESS, STRENGTH AND HARDNESS

[75] Inventors: Roger L. K. Matsumoto, Newark, Del.; Anil V. Virkar, Salt Lake City; Raymond A. Cutler, Bountiful, both of Utah

[73] Assignee: Cerametec, Inc., Salt Lake City, Utah

[21] Appl. No.: 335,046

[22] Filed: Apr. 7, 1989

[51] Int. Cl.$^5$ .............................................. C04B 35/48
[52] U.S. Cl. ................................. 501/105; 501/104; 501/127; 501/153
[58] Field of Search ................ 501/105, 104, 127, 153

[56] References Cited

U.S. PATENT DOCUMENTS

| | | | |
|---|---|---|---|
| 3,414,418 | 12/1968 | Hubble et al. | 501/105 |
| 4,316,964 | 2/1982 | Lange | 501/105 |
| 4,626,518 | 12/1986 | Watanabe et al. | 501/105 |
| 4,643,985 | 2/1987 | Ando et al. | 501/127 |
| 4,824,815 | 4/1989 | Kugler | 502/65 |
| 4,843,042 | 6/1989 | Dole et al. | 264/65 |

OTHER PUBLICATIONS

J. Mater, Sci., (17), 225–263, (1982).
Tsukuma et al., "Mechanical Property and Microstructure of TZP and TZP/Al$_2$O$_3$ Composites," Mat Res. Soc. Symp. PROC., vol. 78, pp. 123–135, (1987).

*Primary Examiner*—William R. Dixon, Jr.
*Assistant Examiner*—Sue Hollenbeck
*Attorney, Agent, or Firm*—Trask, Britt & Rossa

[57] ABSTRACT

A ceramic comprising a matrix of Al$_2$O$_3$, ZrO$_2$ (partially or fully stabilized) or mixtures of Al$_2$O$_3$ and ZrO$_2$ with strontium aluminate plate-shaped grains distributed throughout the matrix results in a ceramic with high toughness, high strength and good hardness. SrO/Al$_2$O$_3$ molar ratios between 0.02 and 0.20 result in in-situ formation of plate-shaped grains approximately 0.5 μm in thickness and 5.0 μm in breadth in tetragonal zirconia polycrystalline ceramic matrices. The in-situ formation of strontium aluminates allows high volume loading of platelets to occur and high toughness is achieved without the loss of strength. High alumina compositions have the added benefit of higher strength, lower thermal expansion, higher modulus and higher thermal conductivity than zirconia ceramics with comparable toughness.

27 Claims, 2 Drawing Sheets

CERAMICS WITH HIGH TOUGHNESS, STRENGTH AND HARDNESS

STATEMENT OF GOVERNMENT INTEREST

This invention was made with Government support under contract No. F49620-87-C-0077 awarded by the Defense Applied Research Project Administration (DARPA). The Government has certain rights in this invention.

BACKGROUND OF THE INVENTION

1. Field of the Invention: This invention relates to the field of ceramics and particularly to alumina-zirconia composite ($Al_2O_3$-$ZrO_2$) ceramics.

2. Description of the Prior Art: High toughness $ZrO_2$ ceramics have been fabricated by taking advantage of the volume increase which accompanies the change from tetragonal to monoclinic transformation. This "transformation toughening" (F. Lange, *J. Mater. Sci.*, 17 225-263 (1982)) increases the energy required for crack propagation. U.S. Pat. No. 4,316,964 to Lange increased the fracture toughness of $Al_2O_3$-$ZrO_2$ ceramics by dissolving a rare earth oxide such as $Y_2O_3$, $CeO_2$, $La_2O_3$ and/or $Er_2O_3$ in the $ZrO_2$ so as to stabilize metastable tetragonal $ZrO_2$ at low temperatures.

Hafnium Oxide ($HfO_2$) undergoes a martensitic transformation similar to that of $ZrO_2$ except that the monoclinic to tetragonal transformation temperature increases and the volume expansion for the tetragonal to monoclinic transformation decreases. Due to the lack of commercially available $HfO_2$ powders, $ZrO_2$-based ceramics are used in applications such as insulators, values, die-liners, cutting tools and wear parts. Since $ZrO_2$ and $HfO_2$ form a solid solution, mixtures of zirconia and hafnia can be used to control the transformation temperature.

Two of the most commonly used additives for stabilizing tetragonal $ZrO_2$ are $Y_2O_3$ and $CeO_2$. $ZrO_2$-based ceramics stabilized with $Y_2O_3$ generally have higher strength but lower toughness than $ZrO_2$-based ceramics stabilized with $CeO_2$. Such ceramics are generally classified as tetragonal zirconia polycrystals "TZP" due to their fine-grained microstructure which is nearly all tetragonal at room temperature.

The strength of yttria TZP (Y-TZP) and ceria TZP (CeTZP) ceramics increases with alumina additions and the fracture toughness correspondingly decreases (K. Tsukuma and T. Takahata, "Mechanical Property and Microstructure of TZP and TZP/$Al_2O_3$ Composites," *Advanced Structural Ceramics*, Vol. 78, ed. by P. F. Becher, M. V. Swain and S. Somiya (Materials Research Society, Pittsburgh, PA, 123-135, 1987)).

The maximum in fracture toughness for both Y-TZP/$Al_2O_3$ and Ce-TZP/$Al_2O_3$ composites occurred at approximately 30 volume percent (vol. %) $Al_2O_3$. In the case of Y-TZP/$Al_2O_3$ ceramics, Tsukuma add Takahata found that strength increased from 1.5 gigapascals(GPa) to 2.4 GPa while fracture toughness simultaneously decreased from 11 $MPa.ml/^{\frac{1}{2}}$ to 6 $MPa.ml/^{\frac{1}{2}}$ with increasing $Al_2O_3$ up to 30 vol. %. The same investigators found similar results with Ce-TZP/$Al_2O_3$ ceramics in that strength increased from 200 MPa to 900 MPa while fracture toughness simultaneously decreased from 32 $MPa.ml^{\frac{1}{2}}$ to 14 $MPa.m^{\frac{1}{2}}$ with increasing $Al_2O_3$ up to 30 vol. %. While absolute numbers are not crucial since testing methods may influence the data, the general trends are important and show the strength fracture toughness trade-off which exists in $ZrO_2$-based ceramics.

$Al_2O_3$ has low strength and toughness as compared to $ZrO_2$ ceramics. $Al_2O_3$/$ZrO_2$ ceramics are attractive, as compared to $ZrO_2$ ceramics, for high temperature applications since alumina has better retention of mechanical properties (i.e., strength and toughness) as a function of temperature than zirconia. The strength and toughness of TZP materials decrease rapidly with temperature, since the stability of the tetragonal polytype is increased, thereby making transformation toughening more difficult. Additionally, alumina additions to zirconia are beneficial in applications where creep resistance is required and certain applications where the erosion or wear resistance of the ceramic is not controlled by the fracture toughness. The higher hardness of $AlO_{03}$/-$ZrO_2$ composites in these applications generally relates to improved wear or erosion resistance. Alumina has higher thermal conductivity and lower thermal expansion than zirconia which is advantageous in limiting thermal shock. It would therefore be an improvement in the art if fracture toughness could be maintained while adding alumina to TZP ceramics and if high toughness $Al_2O_3$/$ZrO_2$ ceramics could be made with increasing amounts of $Al_2O_3$. Furthermore, it would be an improvement in the art if $Al_2O_3$/$ZrO_2$ ceramics could be made without the traditional strength-fracture toughness trade-off. In the following summary of the invention it is given that $HfO_2$ (or $HfO_2$. $ZrO_2$ solid solutions) can be substituted for $ZrO_2$.

SUMMARY OF THE INVENTION

The invention includes a matrix of $Al_2O_3$, $ZrO_2$ (partially or fully stabilized) or mixture of $Al_2O_3$ and $ZrO_2$ with strontium aluminate plate-shaped grains distributed throughout the matrix. The resultant ceramic has high toughness, high strength and good hardness. Strontia alumina ($SrO/Al_2O_3$) $SrO/Al_2O_3$ molar ratios between 0.02 and 0.20 result in in-situ formation of plate-shaped grains approximately 0.5 microns ($\mu m$) in thickness and 5.0 microns ($\mu m$) in breadth in tetragonal zirconia polycrystalline ceramic matrices. The in-situ formation of strontium aluminates allows high volume loading of platelets to occur and high toughness is achieved without the loss of strength. High alumina compositions have the added benefits of higher strength, lower thermal expansion, higher modulus and higher thermal conductivity than zirconia ceramics with comparable toughness.

The resulting ceramic has high toughness, good strength, by in-situ formation of plate-like $SrO.6Al_2O_3$ in an $Al_2O_3$, $ZrO_2$ or $Al_2O_3$/$ZrO_2$ matrix.

An $Al_2O_3$/$ZrO_2$ ceramic made according to the invention has high toughness, high strength, and increased hardness.

A $ZrO_2$-$Al_2O_3$-$SrO.6Al_2O_3$ ceramic made according to the invention may have $SrO.6Al_2O_3$ plate-like grains approximately 5 $\mu m$ in breadth by approximately 0.5 $\mu m$ in thickness distributed throughout the $ZrO_2/Al_2O_3$, $ZrO_2$ or $Al_2O_3$ matrix.

According to the invention, simultaneous additions of $Al_2O_3$ and SrO allow for the in-situ formation of $SrO.6Al_2O_3$ platelet grains in a $Al_2O_3$, $ZrO_2$ or $Al_2O_3$/$ZrO_2$ matrix. The toughness increases with increasing amount of $SrO.6Al_2O_3$ formation until the $SrO/Al_2O_3$ molar ratio is between approximately 0.02 to 0.20.

DESCRIPTION OF THE PREFERRED EMBODIMENTS

Figure 1:
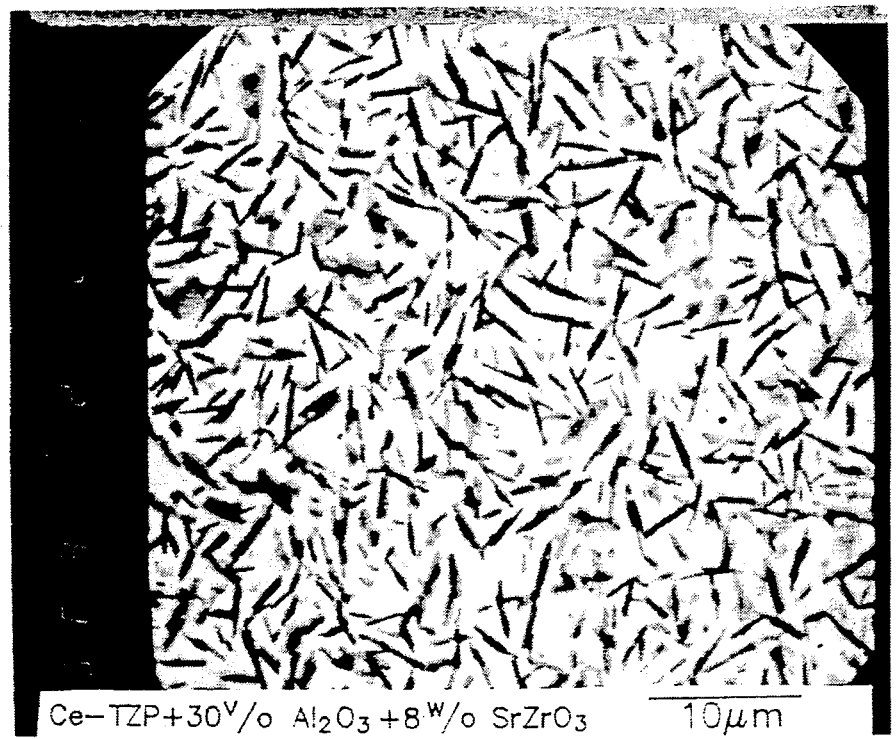
FIG. 1 is a scanning electron micrograph (microphotograph) of a polished cross-section of Example 16. The starting composition was $ZrO_2$(12 mol. % $CeO_2$)-30 vol. % $Al_2O_3$-8 wt. % $SrZrO_3$. Plates of $SrO.6Al_2O_3$ appear as whisker-like particulates on the polished cross-section. The matrix is composed mainly of Ce-TZP.

Most additives to $ZrO_2$ go into solution at sintering temperature and affect the polytype of zirconia retained and hence affect the fracture toughness. Such additives include MgO, CaO, $Y_2O_3$ and the lanthanide oxides. $Al_2O_3$ does not go into solution with $ZrO_2$ to a large extent and is an effective grain growth inhibitor. SrO is not an effective toughening agent when added to $ZrO_2$ and adversely affects the toughness of Ce-TZP. Scanning electron microscopy shows no evidence of a second phase when up to 4 wt. % $SrZrO_3$ is added to $ZrO_2$(12 mol. % $CeO_2$). It appears that SrO does limit the grain growth in Ce-TZP, resulting in higher hardness and strength. The mechanical properties of Ce-TZP containing small amounts of SrO are not attractive, as is shown in Examples 8–11. However, simultaneous additions of SrO and $Al_2O_3$ result in the formation of plate-like strontium aluminate second phase grains. These grains form during the sintering process and appear to oppose densification, since higher SrO additions result in lower densities and require higher temperature in order to achieve a state of closed porosity. The equilibrium aluminate which forms between small amounts of SrO and high concentrations of $Al_2O_3$ is $SrO.6Al_2O_3$. This aluminate can be formed with SrO added as a zirconate, nitrate, or carbonate by the in-situ reaction with $Al_2O_3$ at temperatures above approximately 1200° C. The temperature must be high enough to allow inter-diffusion to occur and time at temperature is also important.

By controlling the amount of SrO added relative to $Al_2O_3$ (i.e., the $SrO/Al_2O_3$ molar ratio), $ZrO_2$, $Al_2O_3$ or $ZrO_2/Al_2O_3$ ceramics can be made with strength similar to that achieved with $Al_2O_3$ additions to $ZrO_2$ and with fracture toughness similar to TZP ceramics, with the added benefit of higher hardness than can be achieved in TZP. The enhancement of properties coincides with the formation of $SrO.6Al_2O_3$ platelets in the microstructure. X-ray diffraction, however, shows that there is substantial transformation toughening still occurring when tetragonal $ZrO_2$ is used as the matrix. Due to the higher stiffness which occurs upon adding $Al_2O_3$ to $ZrO_2$, transformation zones are small in these tough materials suggesting that other toughening mechanisms are operating simultaneously with transformation toughening. The strontium aluminate plates, for example, may bridge cracks and enhance toughness. While the exact mechanism of toughening is not understood, the simultaneous addition of SrO and $Al_2O_3$, which coincides with the formation of $SrO.6Al_2O_3$ platelets in the microstructure not only results in high toughness, but strength comparable to $Al_2O_3$ additions to $ZrO_2$ is achieved. The instant invention therefore has both high toughness and high strength. Using the testing methods described in Examples 1–6, the terms high toughness and high strength, refer to values in excess of 10 MPa.m$^{\frac{1}{2}}$ and 500 MPa, respectively.

High toughness and high strength can sometimes be achieved by adding whiskers to a ceramic matrix as has been demonstrated for SiC whisker-reinforced $Al_2O_3$. It is difficult to pressureless sinter this material at whisker loadings greater than approximately 25 vol. % since the whiskers, which are approximately 0.5 $\mu$m in diameter and 10–100 $\mu$m long impede sintering. In the present invention, the platelets form in-situ during sintering and therefore platelet loadings of up to 60 vol. % have been achieved. At high strontium aluminate platelet loadings the ceramic appears to be more creep resistant and more useful in high temperature applications as compared to TZP materials.

Optimum properties are achieved at high alumina to strontia molar ratios which suggest that the aluminate $SrO.6Al_2O_3$ is preferred. X-ray diffraction confirms that the platelets are primarily $SrO.6Al_2O_3$. The preferred matrix is $ZrO_2$(12 mol. % $CeO_2$) although other matrices can be toughened including Y-TZP, cubic $ZrO_2$, $ZrO_2$ containing mixtures of polytypes (monoclinic and/or tetragonal and/or cubic), $Al_2O_3$, and mixtures of $Al_2O_3$ and $ZrO_2$. Preferably the matrix will undergo transformation toughening if high toughness is desired. It is advantageous, however, for many applications to strengthen cubic zirconia or alumina, even though the toughness is not in excess of 10 MPa.m$^{\frac{1}{2}}$. Matrices which allow $Al_2O_3$ and SrO to react and do not react with $SrO.6Al_2O_3$ are also candidates for toughening.

Conventional powder processing techniques can be used to make dense ceramics. Co-precipitation or sol-gel processing can be used to synthesize powders or conventional raw materials can be used. Although $SrO.6Al_2O_3$ platelets could be formed first and added as a raw material, it is preferable to allow in-situ formation since this allows for better dispersion and higher loading of the platelets. The reactants which must include a source of SrO and $Al_2O_3$, or suitable raw materials which allow SrO and $Al_2O_3$ as a byproduct during processing.

The selected reactants can be mixed by ball milling, vibratory milling, attrition milling, jet milling, high shear mixing or another suitable technique. The powder is then formed by pressing, injection molding, slip casting, extrusion, tape casting, or any other conventional method used for ceramic processing.

The sintering temperature is generally above 1200° C. unless submicron reactants are used in order to speed up the kinetics of the reaction. Sintering times between 1300 and 1700° C. are suitable when conventional raw materials are used. Sintering times depend on the temperature but preferably range between 30 minutes and 150 minutes.

The matrix is preferably fine-grained with equiaxed grains between 0.1 and 10 $\mu$m in diameter. The breadth and thickness of the $SrO.6Al_2O_3$ platelets depend on the length of time at sintering temperature. Platelets with aspect ratios greater than 2 are required and aspect ratios greater than 5 are preferred. As used herein, aspect ratio is the ratio of the width of plates relative to the thickness of the plates. The breadth and thickness of $SrO.6Al_2O_3$ grains formed by sintering Ce-TZP for 2 hours at 1500°–1600° C. is approximately 5 μm and 0.5 μm, respectively. Breadths up to 10 μm have been observed and longer sintering times will lead to larger grains. Some $ZrO_2$ or dopants which go into solution in $ZrO_2$ may be entrapped or in solution in the strontium aluminate platelets. Other strontium aluminates may also exist along with $SrO.6Al_2O_3$. The invention is further illustrated by the following examples.

Additional details of the invention will appear from the examples in conjunction with the drawings and the claims.

EXAMPLES 1-6

(Ce-TZP with 15 vol. % $Al_2O_3$ and SrO)

A series of 6 powders were made using TZ-12CE (Toyo Soda Manufacturing Co., Ltd) powder which is comprised of $ZrO_2$-12 mol % $CeO_2$ in order to make a Ce-TZP ceramic. The first powder contained no alumina while the other five powders all contained 10 wt. % (15 vol. %) CR-30 (Baikowski International Corp.) $Al_2O_3$. The wt. % TICON-160 (Tam Ceramics) $SrZrO_3$ varied between 0 and 4.0 wt. % as shown in Table 1.

TABLE 1

| | Compositions for Examples 1-6 | | |
|---|---|---|---|
| | Weight (grams) | | |
| Example | $ZrO_2$ (TZ-12CE) | $Al_2O_3$ (CR-30) | $SrZrO_3$ (TICON-160) |
| 1 | 300.00 | 0.00 | 0.00 |
| 2 | 270.00 | 30.00 | 0.00 |
| 3 | 270.03 | 27.00 | 2.97 |
| 4 | 272.73 | 25.78 | 1.49 |
| 5 | 264.71 | 29.41 | 5.88 |
| 6 | 259.61 | 28.85 | 11.54 |

The powders were vibratory milled using $ZrO_2$ media for 24 hours in 300 grams n-hexane after adding a dispersant (0.5 wt. % PA-78B (Witco Chemical Co.)). The milled powders were wet screened through a 325 mesh screen and air dried before dry screening through a 170 mesh screen. The powders were uniaxially pressed into strength and double cantilever beam (DCB) fracture toughness bars at 35 MPa, followed by isostatic pressing at 200 MPa. The pressed bars were sintered in air at 1500° C. for two hours and subsequently diamond ground to a 220 grit finish.

The strength bars (approximately 4 mm×5 mm×50 mm) were tested in 4-point bending using an outer span of 40 mm and an inner span of 20 mm at a crosshead speed of 0.5 mm/min. Means and standard deviations were taken from 5–10 bars. Fracture toughness was measured using the DCB technique with the means and standard deviations calculated from 3 bars with up to 15 measurements per composition. Hardness was measured using a Vickers 136° diamond indenter on a polished cross-section of a tested strength bar. The mean values are the result of measurements on five indentations at loads of 75–200 N.

Density, strength, fracture toughness and hardness for Examples 1-6 are given in Table 2.

TABLE 2

| Physical Property Data for Examples 1-6 | | | | |
|---|---|---|---|---|
| Example | Density (g/cc(% T.D.)) | Strength (MPa) | Fracture Toughness (MPa·m$^{\frac{1}{2}}$) | Hardness (GPa) |
| 1 | 6.21(99.1) | 388 ± 17 | 12.6 ± 1.1 | 9.5 ± 0.20 |
| 2 | 5.88(99.3) | 634 ± 19 | 8.3 ± 0.2 | 11.5 ± 0.90 |

TABLE 2-continued

| Physical Property Data for Examples 1-6 | | | | |
|---|---|---|---|---|
| Example | Density (g/cc(% T.D.)) | Strength (MPa) | Fracture Toughness (MPa·m$^{\frac{1}{2}}$) | Hardness (GPa) |
| 3 | 5.91(99.9) | 589 ± 17 | 11.0 ± 0.2 | 11.5 ± 0.12 |
| 4 | 5.85(99.0) | 574 ± 46 | 12.5 ± 0.4 | 11.5 ± 0.17 |
| 5 | 5.68(96.3) | 520 ± 53 | 14.0 ± 0.7 | 10.3 ± 0.30 |
| 6 | 5.72(96.9) | 570 ± 38 | 12.2 ± 0.3 | 10.2 ± 0.40 |

As shown in Table 2, when $Al_2O_3$ is added to Ce-TZP the strength and hardness increase with a corresponding decrease in fracture toughness (compare Examples 1 and 2). Examples 3–6 show that additions of $SrZrO_3$ lead to an increase in toughness while still maintaining strength. The addition of SrO (as supplied by $SrZrO_3$) leads to the formation of plate-like grains in the matrix. Energy dispersive spectroscopy shows that the plate-shaped grains contain both Sr and Al as would be found in $6Al_2O_3.SrO$. These platelets appear clearly as whisker-like precipitates on polished surfaces even at 0.5 wt. % additions of $SrZrO_3$ when viewed with a scanning electron microscope at magnifications near 1000 times. They can be seen in fracture surfaces as plate-like grains at higher SrO concentrations (i.e., Examples 5 and 6). Typical dimensions for the plates in Examples 3–6 were approximately 5 μm in breadth and 0.5 μm in thickness X-ray diffraction indicates that the platelets are $6Al_2O_3.SrO$ (a strontium aluminate). X-ray diffraction of the fracture surface also shows that the $ZrO_2$ undergoes a large degree of transformation (i.e., there is a large amount of transformation toughening on the fracture surface) showing that transformation toughening is still operative. The toughening shown to occur with the addition of SrO is likely to involve several simultaneous processes, such as transformation toughening ($ZrO_2$) and crack bridging ($6Al_2O_3.SrO$). The density and hardness decrease with higher additions of SrO (Examples 5 and 6) since in-situ formation of platelets hinder sintering. Sintering at higher temperatures (i.e., 1550° C.) allows densification to greater than 99% of theoretical. The addition of SrO to CeTZP/$Al_2O_3$ and the subsequent formation of $6Al_2O_3.SrO$ platelets allow for the toughness of Ce-TZP to be retained while simultaneously having the advantage of the strength and hardness of Ce-TZP/$Al_2O_3$ composites.

EXAMPLES 7-11

(Ce-TZP with SrO)

To show that strontium aluminates are responsible for toughening and not strontium oxide additions, Examples 7–11 were prepared. $ZrO_2$ (E-20, Magnesium Electron) and $CeO_2$ (Molycorp) were added to make $ZrO_2$-12 mol. % $CeO_2$ (Ce-TZP) in Example 7. $SrZrO_3$ additions were made in Examples 8–11 as in Examples 3–6 except that there was no $Al_2O_3$ present in Examples 8–11 in order to form strontium aluminates. The powders, with weights as given in Table 3, were vibratory milled ($ZrO_2$ media) for 48 hours in 315 grams reagent grade methanol.

TABLE 3

| | Compositions for Examples 7-11 | | |
|---|---|---|---|
| | Weight (grams) | | |
| Example | $ZrO_2$ (E-20) | $CeO_2$ (Molycorp) | $SrZrO_3$ (TICON-160) |
| 7 | 630.0 | 120.0 | 0.00 |

TABLE 3-continued

Compositions for Examples 7-11

| Example | Weight (grams) ZrO$_2$ (E-20) | CeO$_2$ (Molycorp) | SrZrO$_3$ (TICON-160) |
| --- | --- | --- | --- |
| 8 | 626.8 | 119.4 | 3.80 |
| 9 | 623.7 | 118.8 | 7.50 |
| 10 | 617.4 | 117.6 | 15.00 |
| 11 | 604.8 | 115.2 | 30.00 |

The powders were wet screened through a 325 mesh (44 μm) screen, dried in a rotary evaporator, and the dried powder was screened through a 170 mesh screen. The dried powder was pressed, sintered, ground and tested as in Examples 1-6, with properties as shown in Table 4.

TABLE 4

Physical Property Data for Examples 7-11

| Example | Density (g/cc(% T.D.)) | Strength (MPa) | Fracture Toughness (MPa · m$^{\frac{1}{2}}$) | Hardness (GPa) |
| --- | --- | --- | --- | --- |
| 7 | 6.21(99.1) | 172 ± 7 | 13.3 ± 0.6 | 7.7 ± 0.1 |
| 8 | 6.21(99.1) | 264 ± 8 | 10.1 ± 0.6 | — |
| 9 | 6.21(99.1) | 388 ± 31 | 5.8 ± 0.2 | 9.5 ± 0.2 |
| 10 | 6.22(99.4) | 389 ± 13 | 5.8 ± 0.2 | — |
| 11 | 6.20(99.0) | 392 ± 23 | 5.8 ± 0.2 | 9.9 ± 0.20 |

When dashed lines are shown in place of property data, no values have been measured at this time. No second phase could be observed in polished cross-sections using optical microscopy or the scanning electron microscope. The microstructures appeared to be single phase using x-ray diffraction. The fact that the density remained constant with increasing SrO additions suggests that the SrO either goes into solution with the ZrO$_2$ or forms small precipitates at grain boundaries which do not affect densification. This is in stark contrast to SrO additions in Examples 2-6 where plate-shaped grains formed in the microstructure. Fracture surfaces revealed that the ZrO$_2$ grain size decreased from approximately 2 μm in Example 7 to near 0.5 μm in Examples 10 and 11. The finer grain size appeared to influence the toughness, strength and hardness. As can be seen by the data in Table 4, the fracture toughness of Example 7, which is similar to the toughness of the Ce-TZP made in Example 1, decreases with increasing SrO additions. The fact that the strength and hardness of Example 7 is lower than Example 1 is likely a consequence of the coarser ZrO$_2$ grain size of Example 7. X-ray diffraction of fracture surfaces showed similar monoclinic contents as in Examples 1-6 indicating that transformation toughening was still operative. The strength and hardness increase as the toughness decreases, as shown by the data for Examples 7-11 in Table 4. Examples 7-11 show that the SrO additions are ineffective in increasing toughness without the simultaneous additions of Al$_2$O$_3$. The later described Examples 12-16, using with the same starting materials, and identical processing to Examples 7-11, agree with the trends observed in Examples 2-6.

EXAMPLES 12-16

(Ce-TZP with 30 vol. % Al$_2$O$_3$ and SrO)

Five compositions were made using identical raw materials as in Examples 7-11, with the exception that 30 vol. % Al$_2$O$_3$ (HPDBM, Reynold's Aluminum Co.) was added and SrZrO$_3$ additions were subsequently increased so that the SrO/Al$_2$O$_3$ ratio remained the same as in Examples 2-6. Weights of the 5 compositions are given in Table 5.

TABLE 5

Compositions for Examples 12-16

| Example | Weight (grams) ZrO$_2$ (E-20) | CeO$_2$ | Al$_2$O$_3$ (HP-DBM) | SrZrO$_3$ (TICON-160) |
| --- | --- | --- | --- | --- |
| 12 | 495.0 | 94.3 | 160.6 | 0.00 |
| 13 | 490.2 | 93.4 | 159.0 | 7.50 |
| 14 | 485.2 | 92.4 | 157.4 | 15.00 |
| 15 | 475.3 | 90.5 | 154.2 | 30.00 |
| 16 | 455.5 | 86.6 | 147.7 | 60.00 |

Processing was identical to that used in Examples 7-11 except that 375 grams of methanol were used when vibratory milling each batch. Mechanical property data are given in Table 6. The fracture toughness is once again increased with the simultaneous additions of Al$_2$O$_3$ and SrO, as in Examples 2-6. Examples 12-16 also show that high toughness and high strength can be achieved simultaneously. The hardness of Examples 12-16 is higher than Examples 2-6 due to the higher content of Al$_2$O$_3$. Polished crosssections once again showed the plate-like formation of strontium aluminates which coincide with the increase in fracture toughness. FIG. 1 shows the polished cross-section of Example 16. As in Examples 5-6, there was difficulty in sintering Examples 15-16 to full density. It was demonstrated that densities above 97% of theoretical could be achieved by increasing the sintering temperature to 1550° C. It is noteworthy that fracture toughness values comparable with those achieved at 15 vol. % Al$_2$O$_3$ were maintained at 30 vol. % Al$_2$O$_3$ (compare Examples 5 and 15). The main advantage of Examples 12-16 over Examples 2-6 is the higher hardness achieved with higher volume fractions of alumina are used.

TABLE 6

Physical Property Data for Examples 12-16

| Example | Density (g/cc(% T.D.)) | Strength (MPa) | Fracture Toughness (MPa · m$^{\frac{1}{2}}$) | Hardness (GPa) |
| --- | --- | --- | --- | --- |
| 12 | 5.53(99.1) | 632 ± 37 | 7.8 ± 0.3 | 14.5 ± 0.2 |
| 13 | 5.53(99.1) | 648 ± 45 | 9.9 ± 0.1 | 14.6 ± 0.1 |
| 14 | 5.52(99.0) | 726 ± 29 | 11.2 ± 0.5 | 13.7 ± 0.5 |
| 15 | 5.47(98.2) | 530 ± 28 | 15.1 ± 0.3 | 12.7 ± 0.2 |
| 16 | 5.15(92.5) | 407 ± 43 | 11.8 ± 0.3 | 12.1 ± 1.6 |

EXAMPLES 17-21

(Ce-TZP with 60 vol. % Al$_2$O$_3$ and SrO)

Examples 17-21 were made to further demonstrate the ease with which in-situ formation of the strontium aluminates occur and the breadth of the invention, allowing high alumina contents to be fabricated. Starting materials for Examples 17-21 were identical to those used in Examples 12-16 respective. The powders were milled in 429 grams n-hexane as in Examples 1-6. The powders were fabricated into bars as in Examples 1-16 with the exception that the bars were sintered at 1600° C. instead of 1500° C. The compositions used are shown in Table 7 (Note that SrO/Al$_2$O$_3$ ratios in Examples 17-21 were similar to those in Examples 2-6 and 12-16).

TABLE 7

Compositions for Examples 17-21

| Example | ZrO$_2$ (E-20) | CeO$_2$ | Al$_2$O$_3$ (HP-DBM) | SrZrO$_3$ (TICON-160) |
|---|---|---|---|---|
| 17 | 430.0 | 82.0 | 488.0 | 0.00 |
| 18 | 414.1 | 81.3 | 483.8 | 20.78 |
| 19 | 399.6 | 80.4 | 478.5 | 41.55 |
| 20 | 369.7 | 78.7 | 468.5 | 78.70 |
| 21 | 307.4 | 75.7 | 450.7 | 166.20 |

Weight (grams)

Physical property data are given in Table 8.

TABLE 8

Physical Property Data for Examples 17-21

| Example | Density (g/cc(% T.D.)) | Strength (MPa) | Fracture Toughness (MPa · m$^{\frac{1}{2}}$) | Hardness (GPa) |
|---|---|---|---|---|
| 17 | 4.78(97.8) | 612 | 7.5 ± 0.2 | 13.1 ± 0.2 |
| 18 | 4.83(98.6) | 650 | 7.8 ± 0.2 | 14.6 ± 0.2 |
| 19 | 4.81(98.0) | 524 | 14.0 ± 0.8 | 13.6 ± 0.2 |
| 20 | 4.71(95.6) | 464 | 8.4 ± 0.9 | 11.7 ± 0.2 |
| 21 | 4.40(88.4) | 309 | 6.1 ± 0.1 | 8.1 ± 0.2 |

These data once again show that high fracture toughness is obtained with strontium aluminate formation. The fracture toughness of Example 19 is similar to that obtained for Examples 5 and 15. The fracture toughness of Al$_2$O$_3$ is approximately 4 MPa.m$^{\frac{1}{2}}$, as measured by the same DCB technique, clearly showing that the high toughness values achieved with the simultaneous additions of Al$_2$O$_3$ and SrO are clearly advantageous and could not have been predicted by a rule-of-mixtures.

Figure 2:
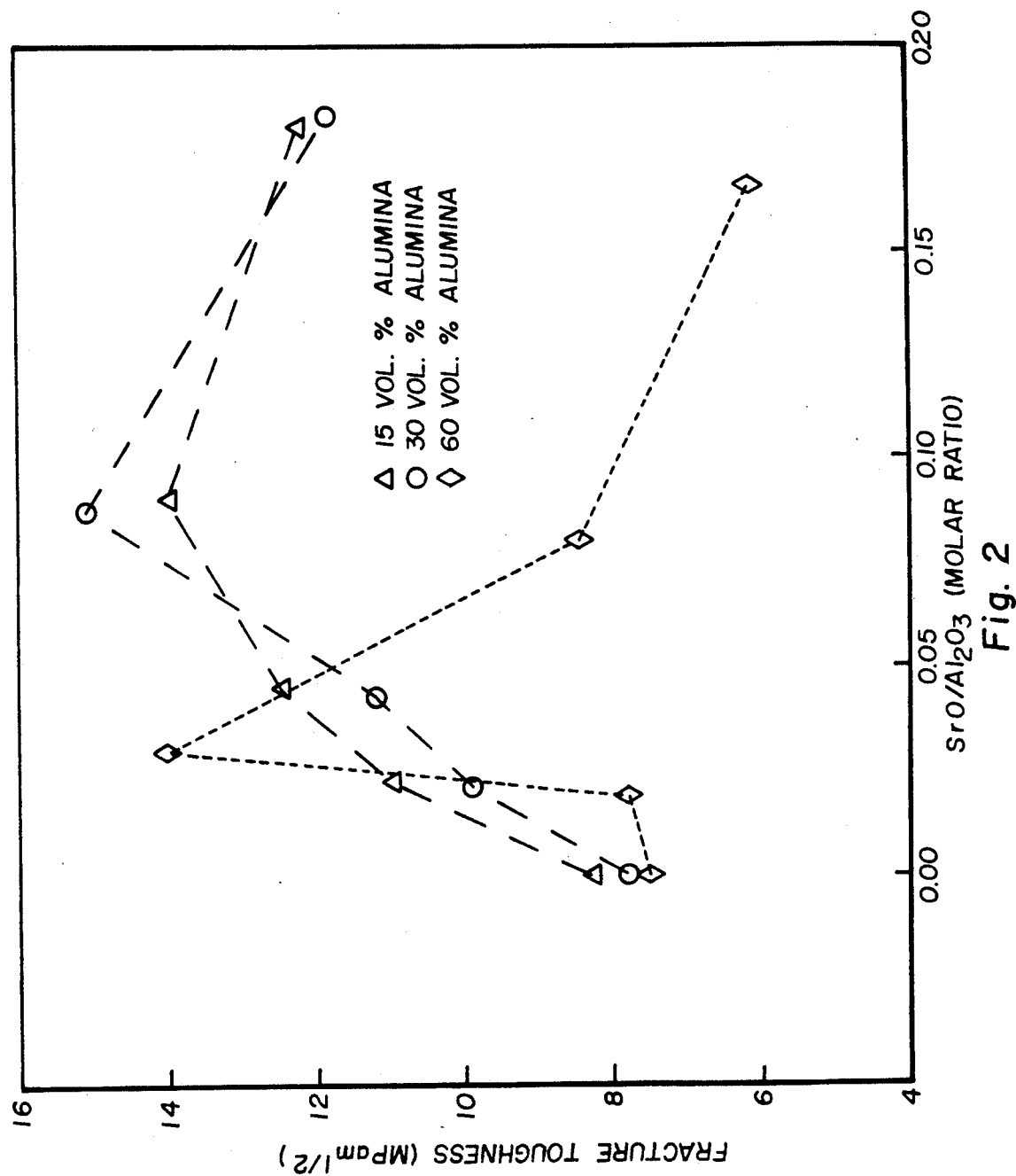
FIG. 2 is a plot of fracture toughness, as determined by the double cantilever beam technique, as a function of $SrO/Al_2O_3$ molar ratio content for $ZrO_2$(12 mol. % $CeO_2$) starting compositions containing 15, 30 or 60 vol. % $Al_2O_3$ with various amounts of SrO. The figure shows that fracture toughness greater than 10 MPa.m$^{\frac{1}{2}}$ can be achieved over a wide range of alumina contents.

FIG. 2 shows the fracture toughness data from Examples 2-6, 12-16, and 17-21, plotted as a function of SrO/Al$_2$O$_3$ molar ratio. It appears that the SrO/Al$_2$O$_3$ ratios over which high toughness (i.e., greater than 10 MPa.m$^{\frac{1}{2}}$) is achieved narrows with increasing Al$_2$O$_3$ content. The optimum SrO/Al$_2$O$_3$ ratio appears to be between approximately 0.02 and approximately 0 20. The fact that the hardness of 60 vol. % Al$_2$O$_3$ compositions was not improved over 30 vol. % compositions appears to be related to the large volume fraction of plate-like aluminates in the microstructure. At 60 vol. % Al$_2$O$_3$, the aluminates appear to form a network throughout the ceramic. Creep testing in air at 1300° C. (stress between 35 and 200 MPa) showed that these materials had creep rates two orders of magnitude lower than conventional commercially available zirconia (Y-TZP) The sintered bars in Examples 17-21 were cladless hot isostatically pressed at 1525° C. resulting in all five compositions having density greater than 96% of theoretical density. Sintering at higher temperature is also expected to increase the density of these parts.

EXAMPLES 22-24

(Y-TZP with 15 vol. % Al$_2$O$_3$ and SrO)

Three compositions were made in order to show that the concept was applicable to yttria TZP ceramics as well. The Y-TZP was TZ-3YA (Toyo Soda Manufacturing Co.) which contains ZrO$_2$ coprecipitated with 3 mol. % Y$_2$O$_3$. The Al$_2$O$_3$ (HP-DBM, Reynolds Aluminum Company) and SrZrO$_3$ (Alfa Chemical) were added as shown in Table 9.

TABLE 9

Compositions for Examples 22-24

| Example | ZrO$_2$ (TZ-3YA) | Al$_2$O$_3$ (HP-DBM) | SrZrO$_3$ (Alfa) |
|---|---|---|---|
| 22 | 500.0 | 0.00 | 0.00 |
| 23 | 500.0 | 50.00 | 0.00 |
| 24 | 500.0 | 50.00 | 11.00 |

Weight (grams)

Processing was identical to Examples 17-21 with 240 grams n-hexane used during vibratory milling. Limited physical property data are given in Table 10.

TABLE 10

Physical Property Data for Examples 22-24

| Example | Density (g/cc(% T.D.)) | Strength (MPa) | Fracture Toughness (MPa · m$^{\frac{1}{2}}$) | Hardness (GPa) |
|---|---|---|---|---|
| 22 | 6.10(99.0) | 731 ± 94 | 5.3 ± 0.1 | 13.3 ± 0.20 |
| 23 | 5.82(99.5) | 758 ± 49 | 4.9 ± 0.1 | — |
| 24 | 5.83(99.3) | — | 5.3 ± 0.1 | — |

When dashed lines are shown in place of property data, no values have been measured at this time. The fracture toughness increased modestly and the microstructure showed platelet formation, although not as pronounced as in the case of Ce-TZP materials. The increase in fracture toughness shows that this same method has merit with respect to dopants other than CeO$_2$.

The compositions of the matrix range from ZrO$_2$-5 vol. % Al$_2$O$_3$ to 100 vol. % Al$_2$O$_3$. The ZrO$_2$ can be tetragonal or cubic or mixtures of the different polytypes including monoclinic. When HfO$_2$ is substituted for ZrO$_2$ and sintering occurs in the monoclinic stability range, 100% monoclinic HfO$_2$ is possible upon cooling. When stabilizers such as CeO$_2$, Y$_2$O$_3$, MgO, CaO, are used, the volume percent ZrO$_2$ includes the stabilizers which are dissolved in the matrix. Ceria is the preferred stabilizer and is typically added between 10 and 16 mol. % and preferably between 11 and 14 mol. %. Other alkaline earth oxide additives form aluminates including BaO, CaO, and MgO. While SrO in combination with Al$_2$O$_3$ has been shown to increase toughness in TZP, other alkaline earth aluminates forming platelets which increase toughness is not a departure from this invention. A variety of sources of SrO can be used including carbonates and nitrates.

The compositions according to the invention are useful in many applications including structural ceramics such as die liners, wear rings, ball bearings, valves, insulators, cutting tools, and applications where high toughness, strength and hardness are desired.

Numerous variations and modifications can be made without departing from the invention. For example, the tough ceramic of the invention claimed herein can be used as a matrix for composites including those made using particulates, whiskers and fibers. Sintering aids can also be added. Accordingly, it should be clearly understood that the form of the invention described above is illustrative only and is not intended to limit its scope which is defined by the claims.

What is claimed is:

1. A ceramic comprising: 10 to 99 percent of a matrix consisting essentially of ZrO$_2$, 1 to 90 percent of substantially strontium aluminate platelet grains having an aspect ratio greater than 2, wherein said zirconia is partially stabilized by a stabilizing agent and said ceramic has a sintered density greater than 95% of its theoretical density.

2. The ceramic of claim 1, wherein the molar ratio $SrO/Al_2O_3$ is between 0.02 and 0.20.

3. The ceramic of claim 1, wherein the matrix has a grain size that is equiaxed and less than 5 microns.

4. The ceramic of claim 3, wherein the matrix is a mixture of zirconia and alumina.

5. The ceramic of claim 1, wherein the $ZrO_2$ matrix is at least partially stabilized to the tetragonal configuration by the inclusion of $CeO_2$.

6. The ceramic of claim 1, wherein the $ZrO_2$ matrix is at least partially stabilized to the cubic configuration by the inclusion of $CeO_2$.

7. The ceramic of claim 1, wherein the zirconia matrix comprises mixtures of polytypes comprising cubic and/or tetragonal and/or monoclinic polytypes of zirconia matrix.

8. The ceramic of claim 1 wherein said zirconia matrix is stabilized with a compound selected from the group consisting of $CeO_2$, $Y_2O_3$, $Er_3O$, $La_2O_3$, $Yb_2O_3$, $Dy_2O_3$, MgO, and CaO.

9. The ceramic of claim 8, wherein the $ZrO_2$ matrix contains $Y_2O_3$.

10. The ceramic of claim 1, wherein the strontium aluminate platelets are substantially made up of $6Al_2O_3.SrO$.

11. The ceramic of claim 1, wherein the aspect ratio of the strontium aluminate is greater than 5.

12. The ceramic of claim 1, wherein the strontium aluminate platelets have an average width of approximately 5 microns and a thickness of approximately 0.5 microns.

13. The ceramic of claim 1, wherein the fracture toughness, as measured by a double cantilever beam technique, is greater than 10 $MPa.m^{\frac{1}{2}}$ at room temperature.

14. The ceramic of claim 13, having a room temperature four-point bend strength greater than 500 megapascals.

15. The ceramic of claim 14, wherein the Vicker's diamond pyramid hardness is greater than 10.0 gigapascals when measured at a load greater than 50 newtons.

16. The ceramic of claim 1, wherein the $SrO/Al_2O_3$ molar ratio is between 0.01 and 0.30.

17. A method of preparing the ceramic of claim 1, comprising: (1) mixing a source of alumina, zirconia, and strontia in appropriate quantities to satisfy the compositional requirements of the ceramic of claim 1, (2) forming a shape, and (3) sintering at a temperature greater than about 1200° C. for 30-150 minutes in order to allow in situ formation of strontium aluminate platelets.

18. The process of claim 17, wherein the source of SrO is $SrZrO_3$.

19. The process of claim 17, wherein the source of SrO is $Sr(NO_3)_2$.

20. The process of claim 17, wherein the source of SrO is $SrCO_3$.

21. The process of claim 17, wherein the sintering temperature is between 1300° C. and 1700° C.

22. The process of claim 17, wherein densification occurs by way of pressureless sintering.

23. The process of claim 20, wherein pressure is applied to aid in the densification of the ceramic.

24. The ceramic of claim 1, wherein the loading of strontium-aluminate platelets constitutes 15-60 volume percent of the ceramic.

25. The ceramic of claim 1 wherein said matrix contains SrO.

26. The ceramic of claim 4 wherein $Al_2O_3$ is present in substantial quantities.

27. A ceramic comprising:
10 to 99 percent of a matrix comprising $ZrO_2$, 1 to 90 percent of substantially plate-like strontium aluminate grains having an aspect ratio greater than 2, said ceramic having a sintered density greater than 95% of the theoretical density of the ceramic and wherein said zirconia is partially stabilized by a stabilizing agent.

* * * * *